May 27, 1969
H. J. CALDERHEAD ET AL
3,447,082
THERMOCOUPLE MILLIWATTMETER
Filed March 8, 1965
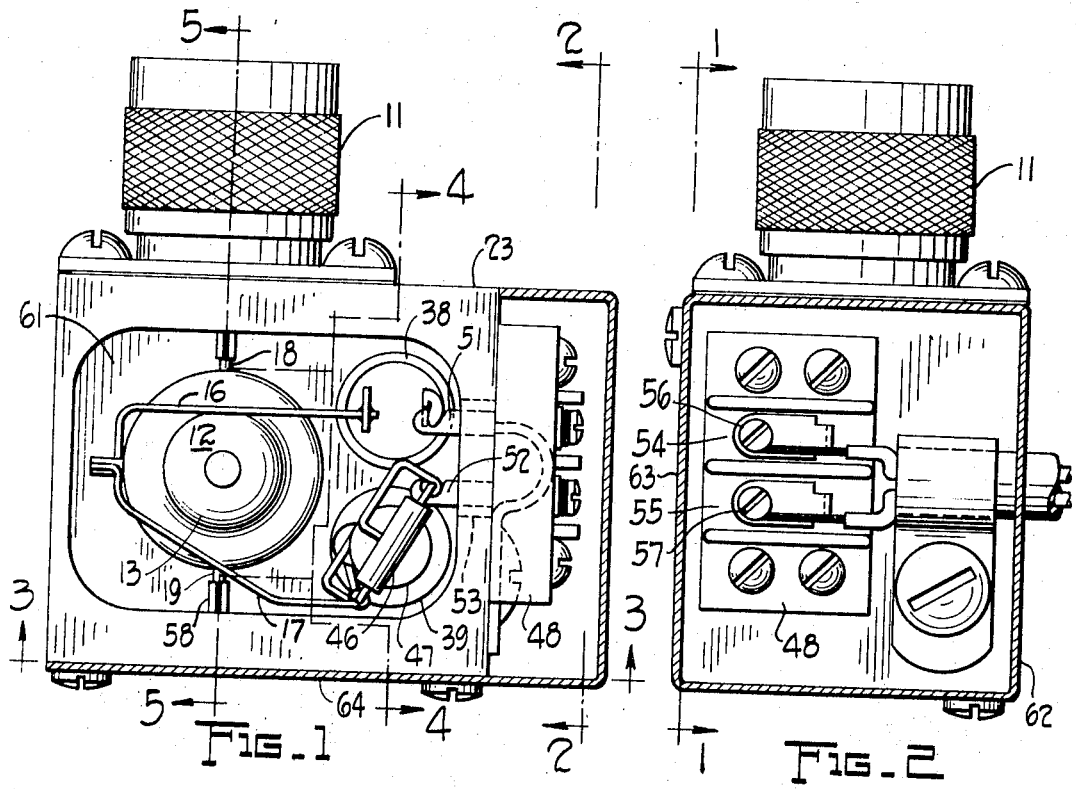
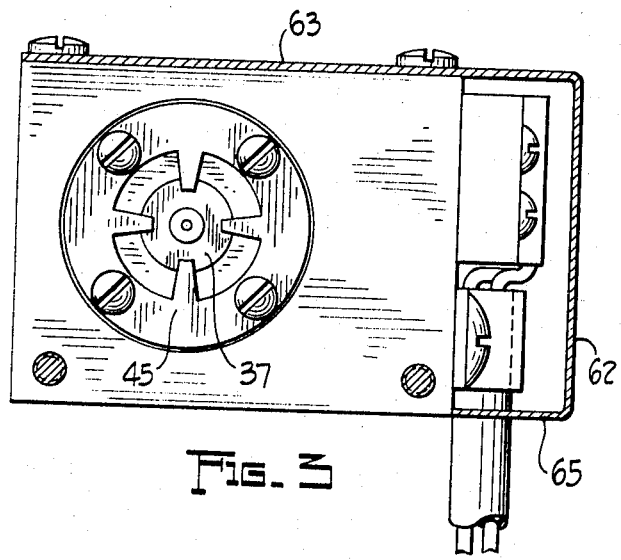
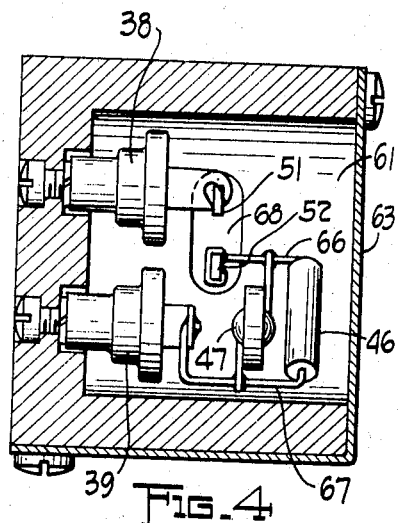
INVENTORS
PHILIP F. PULJER
HENRY J. CALDERHEAD, DECEASED
BY: CATHARINE E. CALDERHEAD
ADMINISTRATRIX
BY: Bosworth, Sessions,
Herrstrom & Knowles
ATTORNEYS.

United States Patent Office 3,447,082
Patented May 27, 1969

3,447,082
THERMOCOUPLE MILLIWATTMETER
Henry J. Calderhead, deceased, late of Euclid, Ohio, by Catharine E. Calderhead, administratrix, Euclid, Ohio, and Philip F. Puljer, Parma, Ohio, assignors to Bird Electronic Corporation, a corporation of Ohio
Filed Mar. 8, 1965, Ser. No. 439,521
Int. Cl. G01r 5/26, 27/02
U.S. Cl. 324—106                6 Claims

ABSTRACT OF THE DISCLOSURE

A coaxial termination for measuring radio frequency power includes a heater element supported at a first end by a disk resistor and at a second end by a disk resistor to provide wide band response characteristics. A thermocouple is provided adjacent the heater element to generate a current for operation of a meter.

---

This invention relates to radio frequency power measurement and concerns particularly the use of power measuring instruments employing thermocouples.

An object of the invention is to obtain a flat frequency response over a wide range in making measurements.

Another object of the invention is to compensate for rise with frequency in a pickup element.

A further object of the invention is to achieve increased reliability, accuracy and scale uniformity in thermocouple wattmeters for radio frequencies.

Other and further objects, features and advantages of the invention will become apparent as the description proceeds.

In carrying out the invention in accordance with a preferred form thereof, a vacuum-type thermocouple is utilized having a heater wire extending through the unit and adapted to be connected in series with a radio frequency circuit, the power of which is to be measured. The thermocouple is insulated with respect to direct current from the heater wire and is thermally and capacitively coupled to the heater wire.

At the frequencies involved, the inherent inductance of the heater wire and the leads of the thermocouple are significant. The resultant shunting and choking effects tend to distort the readings obtained with variations in frequency.

In order to compensate for effects upon the power reading, an input shunt resistor is provided between the input thermocouple lead and the casing, and an output shunt resistor is provided between the output end of the series heater wire and the casing. The shunt-resistance values are so chosen that a flat frequency response is obtained. With one specific illustrative thermocouple, it has been found that a flat frequency response is obtained with the output shunt impedance comparable with the impedance of the series heater wire at 100 megacycles and with the input shunt resistance approximately two thirds of the output shunt resistance but the invention is not limited to these specific numerical relationships.

A better understanding of the invention will be afforded by the following detailed description considered in conjunction with the accompanying drawing, in which:

FIG. 1 is a plan view, partially in cross-section, of an embodiment of the invention;

FIG. 2 is a view of a vertical section of the apparatus of FIG. 1, represented as cut by a plane 2—2, indicated in FIG. 1;

FIG. 3 is a view of a vertical section of the apparatus represented as cut by a plane 3—3;

FIG. 4 is a view of a section of the apparatus of FIG. 1, represented as cut by a plane 4—4 indicated in FIG. 1;

Like reference characters are utilized throughout the drawing to designate like parts.

Figure 6:
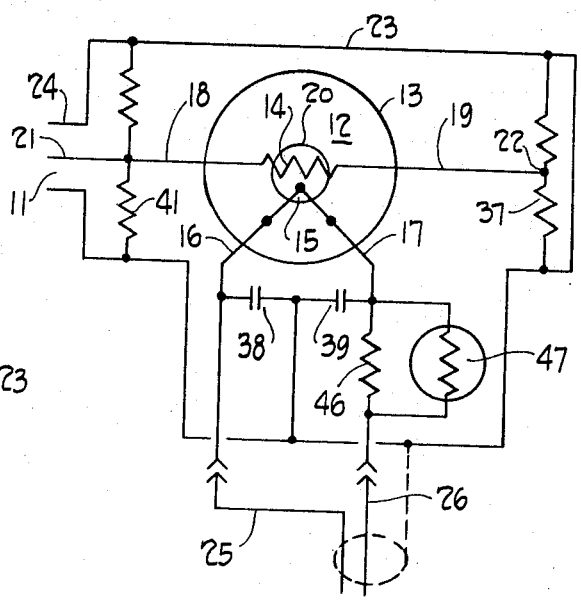
FIG. 6 is a circuit diagram of the apparatus of FIGS. 1 to 5.

The apparatus is designed for connection to a coaxial transmission line and for this purpose a conventional coaxial connector 11 may be employed. There is a thermocouple unit 12 including an evacuated glass envelope 13. As shown diagrammatically in FIG. 6, the thermocouple unit 12 comprises a heater wire 14 insulated from a thermocouple 15 by a glass bead 20 having leads 16 and 17.

The heater wire 14 has input and output leads 18 and 19, respectively, connected to the center pin 21 of the connector 11 and to a concentric line termination 22 so as to form part of the center conductor of a coaxial line system. There is a casing 23 composed of a suitable conductive material such as a brass or alloy metal casting electrically connected to the outer conductor or terminal 24 of the connector 11, so as to serve not only as an enclosure for the thermocouple unit 12 and an electrical shield therefor but also as an extension of the outer conductor of the coaxial line system. The thermocouple leads 16 and 17 are arranged for connection through suitable conductors 25 and 26 to a direct current millivoltmeter or direct current read-out device 27.

Figure 7:
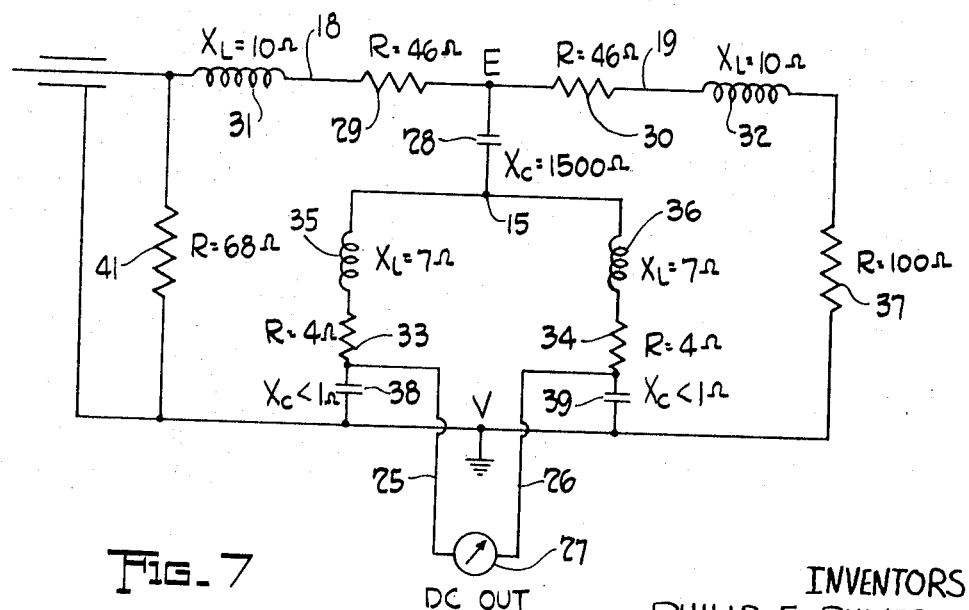
FIG. 7 is an equivalent circuit diagram for the apparatus including inherent reactances of the circuit elements shown in FIG. 6 at 100 megacycles.

As represented in FIG. 7 at the radio frequencies involved, up to the thousands of megacycles, the inherent electrical capacitance 28 between the heater wire 14 and the thermocouple 15 and its leads present such electrical susceptance as to provide a significant shunt current path. The electrical resistance of the heater wire 14 is represented in FIG. 7 in two parts as resistors 29 and 30. The heater wire 14, however, also possesses inherent inductance which introduces electrical reactance represented in FIG. 7 as two series elements 31 and 32. The thermocouple 15 with its leads 16 and 17 also possesses inherent resistance and inductance, represented in FIG. 7 by resistors 33 and 34 and inductance 35 and 36.

Figure 5:
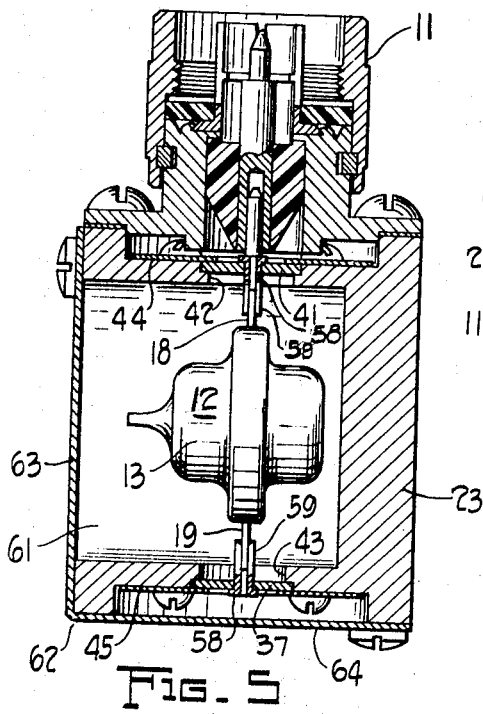
FIG. 5 is a view of a section cut by a plane 5—5 in FIG. 1.

Owing to the shunt and series impedance effects the response of the direct-current instrument 27 to a given current flow through the heater 14 and a given input power from the connector 11 would be affected by variations in the signal frequency. In order to counterbalance the tendency for increased pickup at higher frequencies an output shunt resistor 37 is provided. The thermocouple 15 is grounded with respect to radio frequency alternating current by connecting one or both of the thermocouple leads 16 and 17 to the casing 23 through condensers 38 and 39. Preferably, an input shunt resistor 41 is also provided. The shunt resistors 37 and 41 take the form of resistor discs or radial resistors as shown in FIG. 5 formed in a suitable manner as by means of a very thin metallic coating on a ceramic disc base.

The casing 23 is provided with input and output end openings 42 and 43, respectively, for the coaxial line center conductor elements 18 and 19, counterbored to receive the radial shunt resistors 41 and 37. For securing the radial resistors 41 and 37 in the counterboard openings 42 and 43, spring retainers 44 and 45 are provided.

Preferably a calibrating resistor 46 is connected in series with one of the thermocouple leads 17; and for temperature compensation, a negative temperature coefficient of resistance resistor 47 or a thermistor 47 is provided, shunting the calibrating resistor 46.

For making electrical connections to the D.C. instrument 27, an insulating terminal board 48 is mounted at one end of the casing 23, having conductor strips 51 and 52 projecting through an opening 53 into the casing. The outer ends of the terminal strips 51 and 52 are bent over and laid in slots 54 and 55 in the terminal board 48 to cooperate with terminal screws 56 and 57.

Each of the resistor discs 37 and 41 has a center opening through which a conductor bushing 58 passes which is soldered in place. Each conductor bushing 58 has an extension in the form of spring fingers 59 for receiving the ends of the thermocouple heater leads 18 or 19 to form electrical connection thereto. The casing 23 has an open top 61 to permit assembly of parts within the casing 23. A cover and shield 62 is provided composed of sheet metal having a flat wall 63 for closing the opening 61, a flat end wall 64 for enclosing and electrically shielding the resistor retainer 45 and the resistor 37 and a closed end box 65 for shielding the terminal block 48 and the connections made thereto.

The thermocouple 15 is compensated for the increase in response which a pickup instrument 27 normally shows due to frequency increase. This compensation is provided by a network in which the developed current is divided, one portion traveling to ground through the resistor 37 and the other traveling through the thermocouple 15, the inductances 35, and resistors 33, 34 to ground through capacitors 38 and 39.

The invention is not limited to the use of a particular size or model of thermocouple. However, satisfactory results have been obtained by the use of a vacuum thermocouple with a vacuum junction of the type manufactured by the Barker Sales Company of Ridgefield, N.J. of the ultrahigh frequency type for 5 megacycles and up with the the heater insulated from the thermocouple. This exhibits a nominal resistance in the heater of 92 ohms, a nominal resistance in the thermocouple of 8 ohms for a nominal thermocouple output of 7 millivolts at 5 milliamperes through the heater. Accordingly, the resistances 33 and 34 are 4 ohms each and the resistances 29 and 30 are 46 ohms each. At 100 megacycles the inductances 31 and 32 each have a reactance of 10 ohms and the inductances 35 and 36 each have a reactance of 7 ohms with the inherent capacitance 28 having a capacitive reactance of 1500 ohms. In order to give a flat frequency response over a wide range from low frequencies to 2000 megacycles or more the resistance of the radial resistor 37 is made comparable with that of the heater 14 and the resistance of the input shunt resistor 41 is made about two thirds that of the output shunt resistor 37.

With values assumed the input impedance is computed as given in the following table:

| Frequency: | Input impedance |
| --- | --- |
| D.C. | 50.2 ohms. |
| 50 megacycles | 49.6 ohms at +16'. |
| 100 megacycles | 49.7 ohms at 29'. |
| 300 megacycles | 50.5 ohms at 1°5'. |
| 500 megacycles | 50.2 ohms at 1°7'. |
| 700 megacycles | 50.2 ohms at 41'. |
| 800 megacycles | 49.75 ohms at −13'. |
| 900 megacycles | 47.8 ohms at 54'. |
| 1000 megacycles | 45.6 ohms at +25'. |

In practice a response curve has been obtained which is even flatter than the computed values of the table given above.

If desired, in order to simplify manufacturing and stocking problems, the values of the resistances 41 and 37 may be made the same at 75 ohms, for example, which also gives good compensation with somewhat less flatness over frequency range than for the values of 68 ohms and 100 ohms given in the previous example. An insulating spacer 68 may be provided for the terminal lugs 51 and 52 as shown in FIG. 4. The calibrating resistor 46 is wound on a suitable solid coil form, such as nylon or ceramic material and provided with wire leads 66 and 67 soldered to the terminal lug 52 and to the terminal of the condenser 39, respectively, which the thermistor 47 soldered across the leads 66 and 67 of the resistor 46.

What we claim is:
1. A thermocouple milliwattmeter comprising, in combination:
   an electrically conductive housing having one end closed and the other open;
   an electrical series assembly mounted in said housing, said series assembly including a heater wire;
   a pair of resistor discs, each having its periphery connected to said housing and defining an input and an output shunt resistor for said heater wire;
   an adjacent thermocouple responsive to said heater wire, said heater wire being connected between the centers of said discs, said series assembly being electrically insulated from said housing at said open end thereof;
   a coaxial coupling having its outer conductor connected to said housing and its inner conductor connected to the center of one of said discs; and
   a meter connected to said thermocouple.

2. A thermocouple milliwattmeter according to claim 1 wherein a meter calibrating resistor is connected between said thermocouple and said meter and a temperature compensating resistor is connected in parallel with said calibrating resistor.

3. An instrument as in claim 1 wherein the output shunt resistor has a resistance value comparable with the resistance of the heater wire and wherein the input shunt resistor has a smaller resistance than the said output shunt resistor.

4. An instrument as in claim 3 wherein the heater wire has a resistance approximately nine tenths the resistance of the output shunt resistor and the input resistor has a resistance less than seven tenths the resistance of the output shunt resistor.

5. An instrument as in claim 4 wherein each of the thermocouple leads has an inherent inductance between 30 and 40 percent of the inductance of the heater wire and an inherent resistance approximately 4 percent of the resistance of the output shunt resistor.

6. An instrument as in claim 5 including a direct current read-out device coupled to said thermocouple leads and a pair of capacitors, each connected between an individual one of the thermocouple leads and said outer conductor.

References Cited

UNITED STATES PATENTS

| | | | |
| --- | --- | --- | --- |
| 1,411,033 | 3/1922 | Jensen | 324—106 |
| 1,895,812 | 1/1933 | Morecroft | 324—119 XR |
| 2,131,101 | 9/1938 | Ferris | 333—81 XR |
| 2,238,298 | 4/1941 | Weholin | 324—95 |
| 2,423,447 | 7/1947 | Grimm | 324—95 |
| 2,498,335 | 2/1950 | Hunt | 324—95 XR |
| 2,777,995 | 1/1957 | Henning | 324—95 XR |
| 2,782,377 | 2/1957 | Selby | 324—95 XR |
| 2,974,283 | 3/1961 | Estoppey | 324—106 XR |
| 3,128,428 | 4/1964 | Lush | 324—95 |

RUDOLPH V. ROLINEC, *Primary Examiner*

E. F. KARLSEN, *Assistant Examiner.*

U.S. Cl. X.R.

324—95; 333—22